Aug. 30, 1938.    H. R. TEAR    2,128,383
LUBRICATING DEVICE
Filed April 20, 1935    2 Sheets-Sheet 1
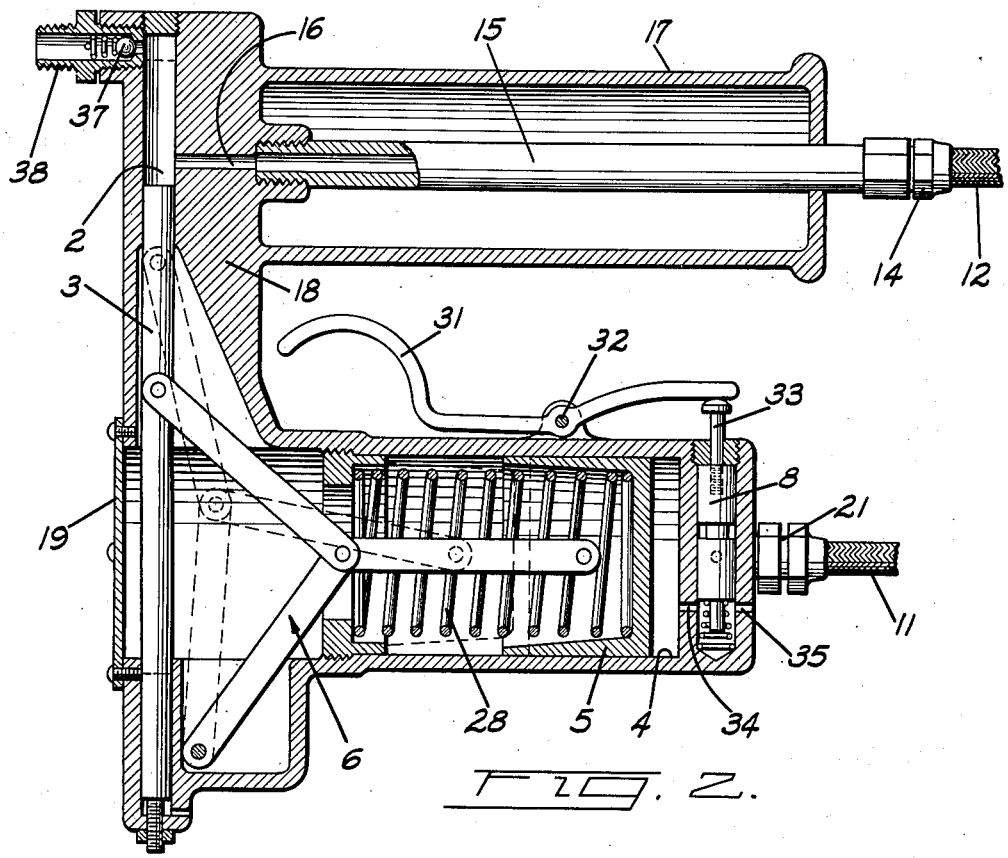
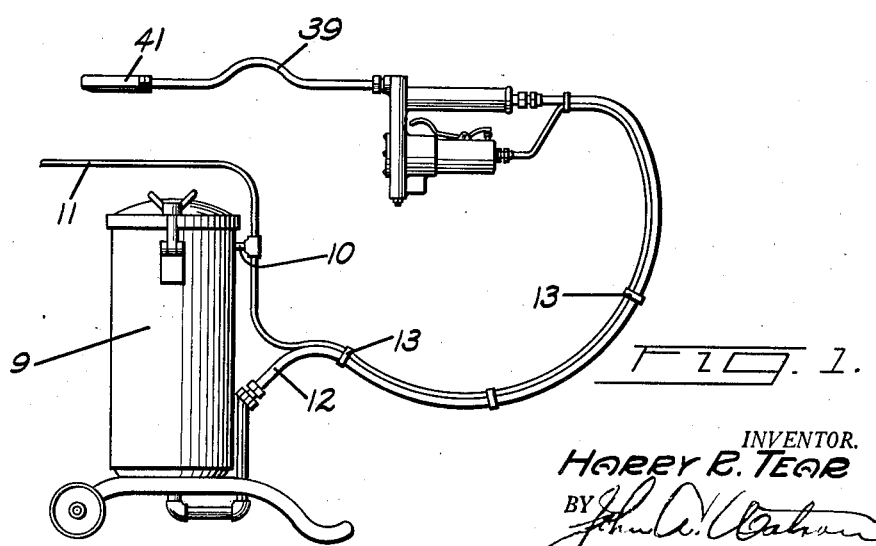
INVENTOR.
HARRY R. TEAR
BY
ATTORNEY.

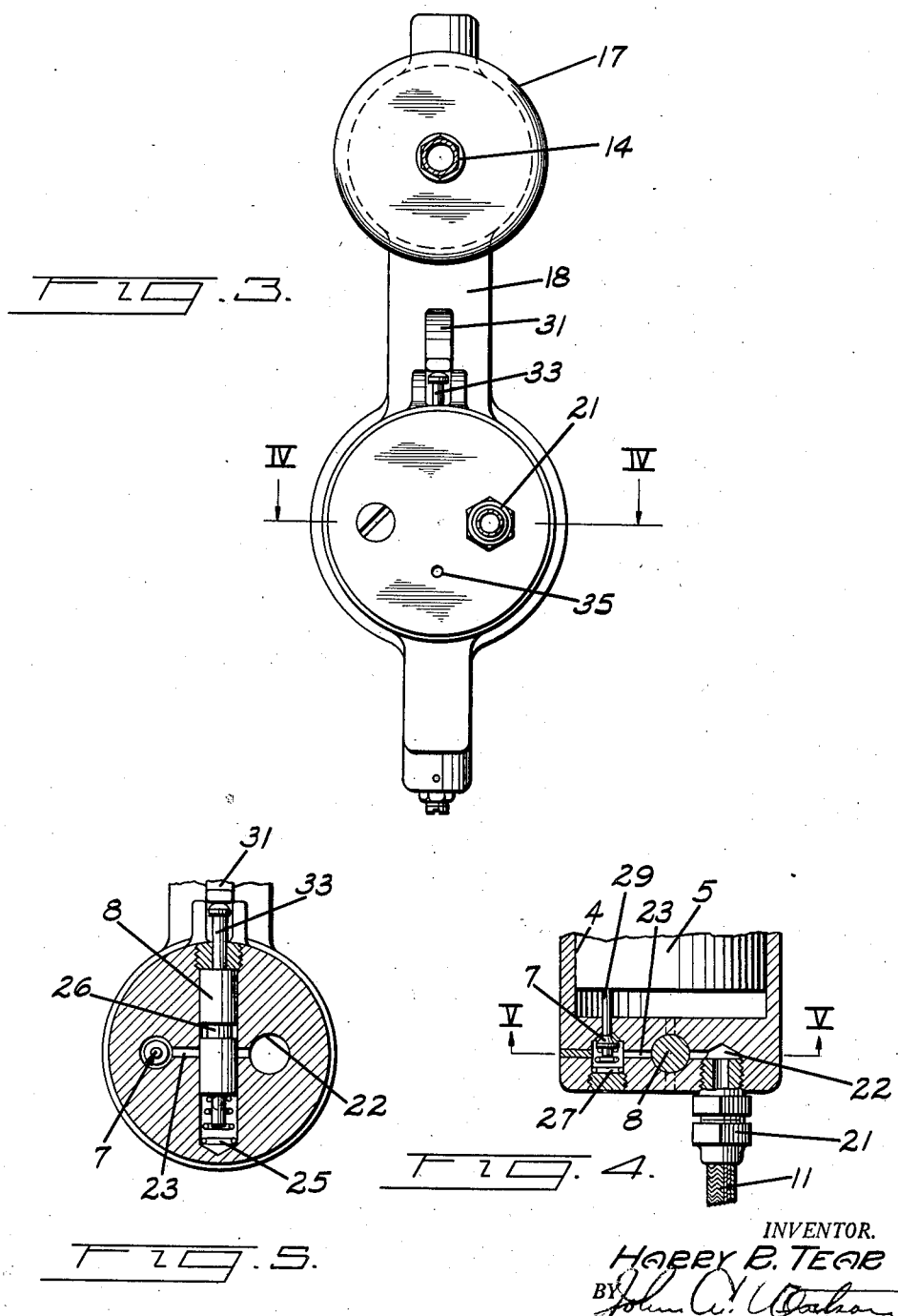

Patented Aug. 30, 1938

2,128,383

UNITED STATES PATENT OFFICE 2,128,383

LUBRICATING DEVICE

Harry R. Tear, Evanston, Ill., assignor to The Lubrication Corporation, Chicago, Ill., a corporation of Delaware Application April 20, 1935, Serial No. 17,406

7 Claims. (Cl. 221—47.3)

This invention relates to improvements in lubricating devices and more particularly to fluid pressure operated lubricating guns.

Fluid operated lubricating guns have been used extensively in the lubricant servicing of motor vehicles, in lubricant service stations, because of the relatively high lubricant pressure which may be developed by such guns, and because of the compactness of the guns and the ease with which they may be manipulated. However, guns of this type as heretofore known have required extremely large amounts of compressed air or other operating fluid under pressure and, as a consequence, have had extremely high operating costs.

It is therefore an object of my invention to provide an improved fluid operated gun which will function efficiently to discharge lubricant under substantially uniform pressure into a lubricant receiving nipple with minimum consumption of fluid under pressure.

A further object is to utilize substantially all of the energy in the compressed fluid by expanding it in the working cylinder.

Another object of the invention is to provide a lubricating gun, as described, wherein the decreasing pressure of compressed air, or other operating fluid admitted to the power cylinder of the gun, due to expansion thereof is compensated for by a compensating drive mechanism between the power piston operating within the fluid cylinder and the plunger of the gun.

A further object is to limit and determine the amount of compressed fluid employed at each operation of the gun.

Other objects, advantages and novel features of the invention will be apparent from the following specification and claims, and after consideration of the accompanying drawings forming a part of the specification, wherein Fig. 1 is a side elevation of a typical lubricant service station apparatus including a fluid pressure operated lubricating gun embodying the present invention;

Fig. 2 is a vertical sectional view of the lubricating gun illustrated in Fig. 1;

Fig. 3 is a rear elevation of the gun of Fig. 2;

Fig. 4 is a partial sectional view along the line IV—IV of Fig. 3, and

Fig. 5 is a sectional view along the line V—V of Fig. 4.

The lubricating gun selected for illustration herein as an embodiment of the invention herein comprises, in general, a body member having a high pressure pump cylinder 2 formed therein, a high pressure pump booster plunger 3 adapted for reciprocation within the cylinder 2, an air motor cylinder 4 having an air operated piston 5 slidable therein, a toggle drive mechanism 6 interconnecting the piston 5 with the booster plunger 3, an automatic air valve 7 (Figs. 4 and 5) for limiting the quantity of compressed air admitted to the cylinder 4 and a manually operated air control valve 8.

The elements above described comprise the major components of the lubricating gun and function cooperatively to discharge lubricant under substantially constant high pressure from the cylinder 2 upon the admission of a charge of compressed air to the cylinder 4, which charge, working against the piston 5, drives the plunger 3 through the varied force multiplying toggle mechanism 6, the increasing force multiplying characteristic of the mechanism 6, as the plunger 3 moves into the cylinder 2, being such as to compensate substantially for the decrease in pressure of the expanding air within the cylinder 4.

With reference to Fig. 1 of the drawings, a typical service station lubricating apparatus including my improved lubricating gun may comprise a lubricant dispenser 9 mounted upon a mobile carriage and containing lubricant adapted to be urged, under the pressure of air admitted to the dispenser 9 at 10 from a flexible air supply conduit 11, through a flexible lubricant supply conduit 12. The dispenser 9 may be of the specific type illustrated in the co-pending application of A. Y. Dodge, Serial No. 606,399, filed April 20, 1932. For convenience in handling, the flexible conduits 11 and 12 may be secured together by bands 13 and formed of a length sufficient to enable the operator to apply the lubricating gun to the various parts of a motor vehicle chassis located in the vicinity of the dispenser 9.

With reference now to Fig. 2, the lubricant conduit 12 may be coupled, as shown at 14, to a rigid conduit 15 communicating in turn with the lubricant inlet port 16 of the pump cylinder 2. If desired, a cylindrical hand grip 17 may be formed upon the body 18 of the gun, concentric with the rigid conduit 15, to facilitate manual support of the gun assembly. The air cylinder 4 likewise may be formed integrally with the body, a cover plate 19 serving to close the opening through the body made necessary for the grinding and finishing of the cylinder wall and assembly of moving parts.

The air conduit 11 may be connected, through a coupler 21, with air inlet port 22 of the gun, see Figs. 4 and 5. An air conducting passageway 23, formed in the end wall of the air cylinder, serves to conduct air from the inlet 22 to the valve 7. The manually operable control valve 8 may be interposed between opposite ends of the air passageway 23 so that when the valve 8 is moved from the position shown in Figs. 2 and 5 downwardly, against the force of its spring 25, air may pass from the port 22 through the passageway 23 by way of an annular groove 26 located about the circumference of the valve 8. Normally the valve 8 lies in the position indicated in Figs. 2 and 5 to shut off communication between the air inlet 22 and automatic valve 7. The valve 7 is normally opened, against the force of the spring 27, by a spring 28 of greater strength than the spring 27 located within the cylinder 4 forwardly of the piston 5 in such a manner as to urge the piston 5 inwardly of the cylinder 4 to abut and depress the stem 29 of the valve 7, as indicated in Fig. 4. When the piston 5 is moved in a direction outwardly of the cylinder 4, as by air admitted through the passageway 23 and through the open valve 7, contact between the piston 5 and valve stem 29 will be discontinued, thereby to permit the valve 7 to close under the force of the spring 27 and under the force of air under pressure acting upon the valve. It will thus be apparent that each time the control valve 8 is depressed and held in its depressed position as by manipulation of a trigger 31 pivotally mounted at 32 upon the body of the cylinder 4 and engageable with the stem 33 of the valve 8, a predetermined quantity of air under pressure will be admitted through the valve 7 to the cylinder 4 before the valve 7 may close as a result of the movement of the piston 5 outwardly of the cylinder, and that thereafter the air within the cylinder 4 may expand to urge the piston 5 to the position indicated in dotted lines in Fig. 2.

During the movement of the piston 5 from full line to dotted line position, as indicated in Fig. 2, and as the air within the cylinder expands, accompanied by a decrease in pressure in pounds per square inch, the plunger 3 will move toward the dotted line position at a decreasing rate of speed but under substantially uniform thrust. This function of the mechanism described is due to the varying force multiplying characteristics of the toggle mechanism 6 compensating, as it were, for the decrease in pressure in pounds per square inch applied to the piston 5 as the air within the cylinder expands. At the end of the pump stroke the operator may release the trigger 31, thus permitting the valve 8 to rise under force of the spring 25, to open the aligned passageways 34 and 35 and thereby to establish communication between the interior of cylinder 4 and atmosphere. With the valve 8 in this, its normal position, the spring 28 may return the piston 5 to the position shown in full lines of Fig. 2, which movement will be accompanied by a rectractile stroke of the booster plunger 3, the cylinder 2 being charged with lurbicant during such stroke from the conduit 12—15.

It will be noted that a check valve 37 is located at the discharge port of the lubricant cylinder 2. The check valve may be incorporated in a threaded nipple 38 adapted for connection with a lubricant discharge conduit 39 which in turn is connected with a coupler 41 adapted to be attached, at will, to a lubricant receiving nipple.

Thus the amount of compressed fluid used for each operation of the gun is determined and limited to the correct amount for maximum efficiency and substantially all of the energy in the compressed fluid is usefully employed by expanding the same in the working cylinder prior to its discharge.

While only one embodiment of the invention has been shown and described, it will be apparent that many changes might be made therein, or that the invention might be embodied in other forms. It is therefore not intended that the scope of the invention shall be limited to the form shown or otherwise than by the terms of the appended claims.

I claim:

1. A lubricating gun, comprising, a lubricant pump cylinder, a piston plunger mounted for reciprocation in said cylinder, an air cylinder, an air operated piston in said air cylinder, means for admitting a charge of compressed air to said air cylinder and thereafter closing the air inlet to the cylinder whereby said air charge may expand and drive said air piston, and drive means including a toggle linkage connected to said air piston and said pump plunger for translating the decreasing thrust of said air piston under the influence of said expanding air charge into substantially uniform thrust applied to said pump plunger against lubricant contained in said pump cylinder.

2. A lubricating gun, comprising, a lubricant pump cylinder, a piston plunger mounted for reciprocation in said cylinder, an air cylinder, an air operated piston in said air cylinder, means for admitting a charge of compressed air to said air cylinder and thereafter closing the air inlet to the cylinder whereby said air charge may expand and drive said air piston, and drive means interposed between said air piston and said pump plunger for translating the decreasing thrust of said air piston under the influence of said expanding air charge into substantially uniform thrust applied to said pump plunger against lubricant contained in said pump cylinder, said last named means including a toggle mechanism mounted at its opposite ends on said plunger and a stationary portion of said gun respectively and having its central pivoted joint connected by a rigid link to said air piston.

3. A lubricating gun comprising, a high pressure pump having a movable plunger, an air motor having a movable element adapted to move through a fixed path relative to the path of movement of said pump element, means for subjecting the movable element of said air motor to the force of an expanding charge of compressed air, and drive means interconnecting the movable elements of said air motor and said pump arranged to drive the pump element upon movement of the air motor element and substantially to compensate for the decreasing thrust applied to the air motor element due to expansion of said air charge, said drive means including a toggle mechanism having the outer ends of the toggle links connected respectively to the movable element of the pump and to a stationary support, and a rigid link interconnecting the pivotal joint of the toggle and said movable element of said air motor.

4. A lubricating gun comprising, a lubricant pump, a power cylinder, a piston in said cylinder connected to said pump to operate the same, fluid pressure inlet and exhaust ports to said cylinder, a manual valve for controlling said inlet and exhaust ports and an automatic valve between the inlet port and said manual valve and automatically operated by said piston.

5. A lubricating device comprising a lubricant pump, a power cylinder, a piston in said cylinder, a compensating linkage connecting the piston and pump to progressively multiply the piston force during the working stroke, a fluid inlet to said power cylinder, and a valve operated by said piston to close said inlet before the piston reaches the end of its working stroke whereby a substantial part of said stroke is caused by expansion of fluid in the cylinder.

6. In a portable grease gun provided with a grease supply means, means surrounding said grease supply means providing a handle rigid with said gun, a discharge nozzle formed for sealing engagement with a lubricant receiving fitting, and a reciprocable grease ejector for forcing grease from said nozzle, the combination of a toggle operatively carried by the grease gun, said toggle including a pair of pivotally connected links, one of said links being operatively connected with said grease ejector, and operating means including a link operatively connected with said toggle for actuating the latter and thereby said grease ejector.

7. In a portable lubricant gun provided with a lubricant supply means, means surrounding said grease supply means providing a handle rigid with said gun, a discharge nozzle formed for sealing engagement with a lubricant receiving fitting, and a reciprocable lubricant ejector adapted to force lubricant from said nozzle, the combination of a toggle operatively mounted upon the lubricant gun, said toggle including a pair of links pivotally connected together, one of said links being operatively connected with said lubricant ejector, a toggle actuating link connected with said toggle at the point of pivotal connection of the links thereof, operating means for said actuating link including a pivoted member lying adjacent and substantially parallel to said supply means and movable toward and away from the supply means to effect operation of the actuating link.

HARRY R. TEAR.